(12) United States Patent
Sridharan et al.

(10) Patent No.: US 9,648,612 B2
(45) Date of Patent: May 9, 2017

(54) METHOD, COMPUTER-READABLE STORAGE DEVICE, AND APPARATUS FOR ALLOCATING TIMESLOTS ON CHANNELS IN A WIRELESS NETWORK

(71) Applicants: AT&T Intellectual Property I, L.P., Atlanta, GA (US); The Trustees of Columbia University in the City of New York, New York, NY (US)

(72) Inventors: Ashwin Sridharan, Morris Plains, NJ (US); Vaneet Aggarwal, Parsippany, NJ (US); Rittwik Jana, Parsippany, NJ (US); Howard Karloff, New York, NY (US); Nemmara K. Shankaranarayanan, Bridgewater, NJ (US); Vinay Anant Vaishampayan, Summit, NJ (US); Robert Margolies, New York, NY (US); Gil Zussman, New York, NY (US)

(73) Assignees: AT&T Intellectual Property I, L.P., Atlanta, GA (US); The Trustees of Columbia University in the City of New York, New York, NY (US)

( * ) Notice: Subject to any disclaimer, the term of this patent is extended or adjusted under 35 U.S.C. 154(b) by 169 days.

(21) Appl. No.: 14/139,213

(22) Filed: Dec. 23, 2013

(65) Prior Publication Data
US 2015/0181596 A1    Jun. 25, 2015

(51) Int. Cl.
*H04W 72/04* (2009.01)
*H04W 4/02* (2009.01)
*H04W 72/08* (2009.01)

(52) U.S. Cl.
CPC ....... *H04W 72/0446* (2013.01); *H04W 4/027* (2013.01); *H04W 72/048* (2013.01); *H04W 72/085* (2013.01)

(58) Field of Classification Search
CPC .......................... H04W 72/0446; H04W 4/027
See application file for complete search history.

(56) References Cited

U.S. PATENT DOCUMENTS

| | | | |
|---|---|---|---|
| 6,198,728 B1 * | 3/2001 | Hulyalkar et al. | ......... 370/310.1 |
| 7,457,973 B2 | 11/2008 | Liu | |

(Continued)

OTHER PUBLICATIONS

Carlo et al., "Low energy operation in WSNs: A survey of preamble sampling MAC protocols," *Computer Networks*, 2011, vol. 55.15, pp. 3351-3363.

(Continued)

*Primary Examiner* — Muthuswamy Manoharan

(57) ABSTRACT

A method, computer-readable storage device, and apparatus for allocating a plurality of timeslots of each channel of a plurality of channels in a wireless network are disclosed. For example, the method determines a location and a velocity for each user endpoint device of a plurality of user endpoint devices, estimates a future data rate for each user endpoint device at the location, estimates future timeslot allocations of each channel of the plurality of channels in the wireless network in accordance with the future data rate that is predicted for each user endpoint device, and allocates each timeslot of the plurality of timeslots of each channel of the plurality of channels in the wireless network to a user endpoint device of the plurality of user endpoint devices in accordance with the future timeslot allocations that are estimated for each channel.

20 Claims, 3 Drawing Sheets

(56) References Cited

U.S. PATENT DOCUMENTS

| | | |
|---|---|---|
| 7,460,624 B2 | 12/2008 | Carsello et al. |
| 7,564,810 B2 | 7/2009 | Hernandez et al. |
| 7,567,820 B2 | 7/2009 | Bitran et al. |
| 7,675,878 B2 | 3/2010 | Simpson et al. |
| 8,014,748 B2 | 9/2011 | Shi et al. |
| 8,082,347 B2 | 12/2011 | Abdelhamid et al. |
| 8,243,620 B2 | 8/2012 | Coleri Ergen et al. |
| 8,275,373 B2 | 9/2012 | Julian et al. |
| 8,473,013 B2 | 6/2013 | Jia et al. |
| 2006/0039450 A1 | 2/2006 | Fulton et al. |
| 2007/0010259 A1* | 1/2007 | Hoffmann ............... 455/456.1 |
| 2007/0248114 A1 | 10/2007 | Jia et al. |
| 2008/0166971 A1* | 7/2008 | Yashiro ............... H04W 28/22 455/66.1 |
| 2009/0213830 A1 | 8/2009 | Duesberg et al. |
| 2010/0083262 A1* | 4/2010 | Gulati et al. ............... 718/102 |
| 2010/0323715 A1* | 12/2010 | Winters ............... G01S 5/0027 455/456.1 |
| 2011/0207489 A1* | 8/2011 | DeLuca ............... 455/509 |
| 2012/0171954 A1 | 7/2012 | Rudland et al. |
| 2012/0207062 A1 | 8/2012 | Corbellini et al. |
| 2013/0225220 A1* | 8/2013 | Dotzler et al. ............... 455/509 |
| 2015/0018018 A1* | 1/2015 | Shen et al. ............... 455/457 |

OTHER PUBLICATIONS

Kumara et al., "Power Efficient Dynamic MAC Protocol (D-MAC) for Wireless Sensor Networks," 2012.

Sun et al., "RI-MAC: a receiver-initiated asynchronous duty cycle MAC protocol for dynamic traffic loads in wireless sensor networks," *Proceedings of the 6th ACM conference on Embedded network sensor systems*, 2008.

Wang et al., "DPS-MAC: An asynchronous MAC protocol for wireless sensor networks," *High Performance Computing—HiPC 2007*, 2007, pp. 393-404.

* cited by examiner

METHOD, COMPUTER-READABLE STORAGE DEVICE, AND APPARATUS FOR ALLOCATING TIMESLOTS ON CHANNELS IN A WIRELESS NETWORK

BACKGROUND

Wireless networks utilize a scheduling algorithm to allocate timeslots on channels to users of the wireless network. For example, a wireless network may allocate one or more timeslots on one or more channels to users of the wireless network via a Proportional Fair (PF) scheduling algorithm. The PF scheduling algorithm is optimal when each user is associated with a particular base-station for a long period of time and the users' movements do not initiate hand-offs between wireless sectors. For example, the PF scheduling algorithm may be optimal when the users are pedestrians or static. However, as wireless devices have become ubiquitous, the users are becoming highly mobile and each user may be associated with a particular base-station for a short period of time.

SUMMARY OF THE DISCLOSURE

In one embodiment, the present disclosure describes a method, computer-readable storage device, and apparatus for allocating a plurality of timeslots of each channel of a plurality of channels in a wireless network. For example, the method determines a location and a velocity for each user endpoint device of a plurality of user endpoint devices, estimates a future data rate for each user endpoint device at the location, estimates future timeslot allocations of each channel of the plurality of channels in the wireless network in accordance with the future data rate that is predicted for each user endpoint device, and allocates each timeslot of the plurality of timeslots of each channel of the plurality of channels in the wireless network to a user endpoint device of the plurality of user endpoint devices in accordance with the future timeslot allocations that are estimated for each channel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
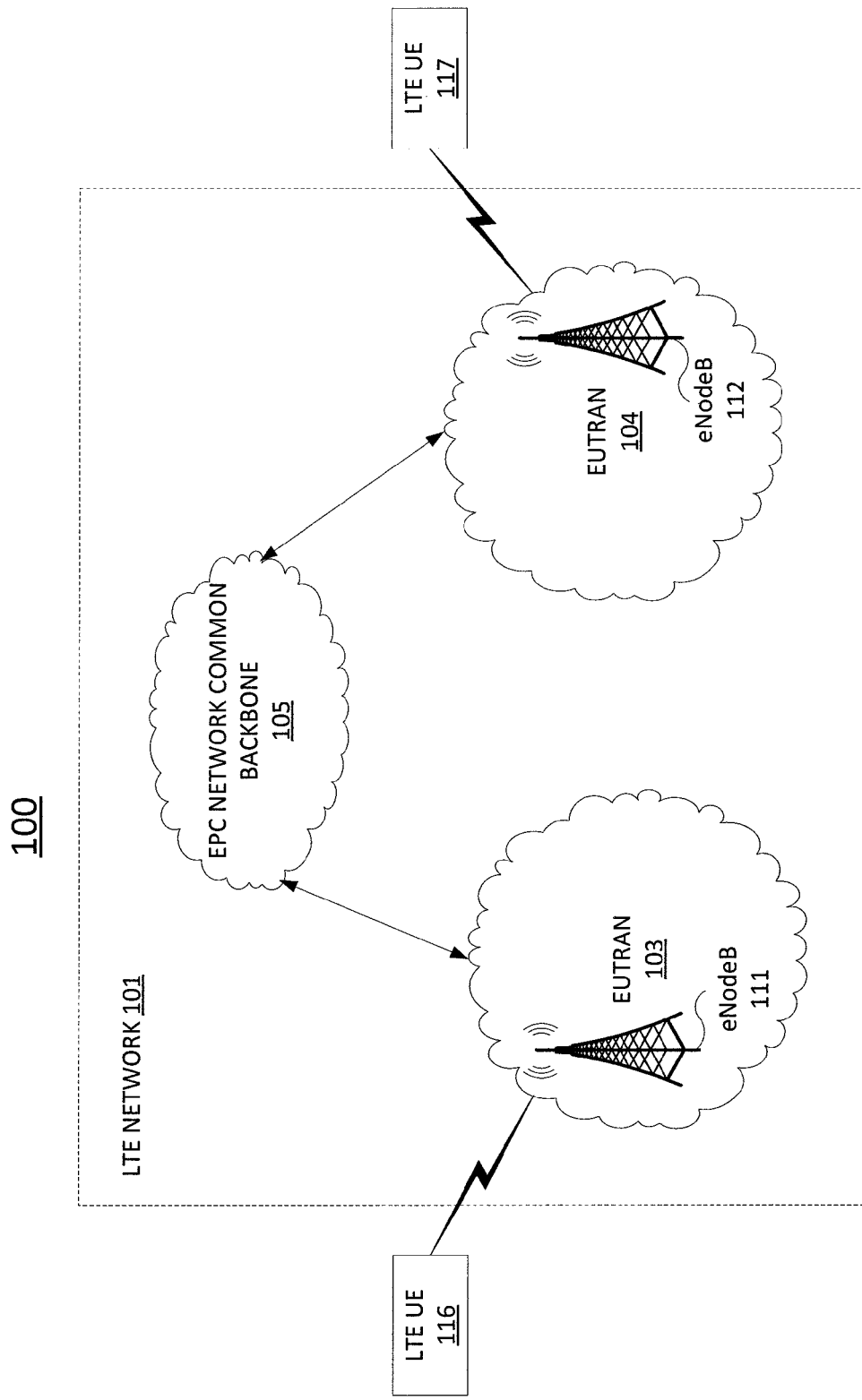
FIG. 1 is a block diagram depicting an illustrative network related to the current disclosure.

The present disclosure broadly describes a method, computer-readable storage device and apparatus for allocating timeslots on channels in a wireless network, e.g., in a long term evolution (LTE) based wireless network and the like. Although the teachings of the present disclosure are discussed below in the context of an LTE network, the teaching is not so limited. Namely, the teachings of the present disclosure can be applied for other types of wireless networks or cellular networks (e.g., 2G network, 3G network, 4G network and the like), wherein efficient allocation of resources increases throughput and is beneficial to the service provider.

Broadly defined, 3GPP is a global effort to define a wireless communication system specification. The 2G refers to a second generation cellular network technology, the 3G refers to a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance to the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. At a particular time period, a particular base station in a 3G wireless network is controlled by a radio network controller (RNC). If at a later time period, another radio network controller is selected to control the traffic traversing through the particular base station, the particular base station is said to be re-homed to the later radio network controller. Similarly, at a particular time period, each base station in a 2G wireless network is controlled by a base station controller (BSC). For the 4G network, a radio base transceiver station (RBS), as per the 3GPP standards, is referred to as an eNodeB (or simply as a base station). An eNodeB for the 4G network provides an LTE—air interface and performs radio resource management for wireless access. It should be noted base stations in accordance with other network protocols or standards are within the scope of the present disclosure.

The radio network controllers and base station controllers route calls from user endpoint devices towards their destination via the service provider's core network. Similarly, calls destined to the user endpoint devices traverse the core network to reach either a radio network controller (for 3G), a base station controller (for 2G) or an eNodeB (for 4G). As applicable, the radio network controllers, base station controllers and eNodeBs forward the calls towards their intended user endpoint device.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a cell that is covered with one directional antenna is referred to as a sector. For example, if there are three directional antennas at a base station, each directional antenna covers 120 degrees, thereby resulting in three sectors. The exemplary base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of the available frequency resources. Adjacent sectors may use different frequency ranges. The channels for adjacent sectors are then assigned in mutually exclusive frequency ranges such that interference is minimized.

FIG. 1 illustrates an exemplary network 100 related to the present disclosure. In one illustrative embodiment, the network 100 comprises an LTE network 101 and user endpoint devices 116 and 117.

The user endpoint devices 116 and 117 can be a smart phone, a cellular phone, a computing tablet, a computer or laptop, or any endpoint communication devices equipped with wireless capabilities.

The LTE network 101 comprises access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. The EPC network 105 provides various functions that support wireless services in the LTE environment. In one embodiment, an EPC network, such as the EPC network 105, is an Internet Protocol (IP) packet core network that supports both real-time and non-real-time service delivery across a LTE network, e.g., as specified by the 3GPP standards.

In operation, LTE user equipment or user endpoints (UE) 116 may access wireless services via the eNodeB 111 located in the eUTRAN 103. Similarly, the LTE UE 117 may access wireless services via the eNodeB 112 located in the eUTRAN 104.

It should be noted that any number of eNodeBs can be deployed in an eUTRAN. In one illustrative example, the eUTRANs 103 and 104 may comprise one or more eNodeBs.

In one embodiment, a wireless network may comprise an opportunistic scheduler. For example, a 2G wireless network may incorporate an opportunistic scheduler in a base station controller that is responsible for allocating time slots to user endpoint devices. In another example, a 3G wireless network may incorporate an opportunistic scheduler in a radio network controller that is responsible for allocating time slots to user endpoint devices. In yet another example, a 4G wireless network may incorporate an opportunistic scheduler in an eNodeB that is responsible for allocating time slots to user endpoint devices that the eNodeB serves.

As described above, each base station may cover a cell which is divided into three sectors. Each user endpoint device estimates the wireless channel quality to each nearby sector. The wireless channel quality to a particular sector for a user endpoint device is estimated by a ratio, denoted by $E_c/I_o$, wherein the ratio comprises a ratio of a power of a sector-specific pilot signal to a total in-band power including interference and noise. A user endpoint device then associates (connects) with the strongest neighboring sector. The strongest neighboring sector is also referred to as the serving sector. The user endpoint device is assigned a dedicated buffer at the serving sector. If at a later time period, the $E_c/I_o$ value of the serving sector drops below a pre-determined threshold (e.g., due to mobility), the user endpoint device hands-off to a new sector. For example, the user endpoint device disassociates from the serving sector and connects to a new sector with a higher $E_c/I_o$ value.

The opportunistic schedulers allocate timeslots to user endpoint devices while aiming to provide high throughput and maintaining fairness among the user endpoint devices. The opportunistic scheduler may utilize a Proportional Fair (PF) scheduling algorithm that allocates resources to user endpoint devices with good channel conditions by leveraging channel state variations and multi-user diversity. The channel state variations are due to fast-fading, on the order of milliseconds, caused by multi-path signal propagation. Fast-fading refers to a characteristic of a received signal, wherein the received signal comprises signal strength with rapid fluctuation. The multi-user diversity refers to a fact that not all user endpoint devices experience a peak for a particular channel, simultaneously.

The PF scheduling algorithms are optimized under the assumptions that the wireless channel state is a stationary process (i.e., it is subject only to fast-fading) and the user endpoint devices' association times with particular sectors are long (e.g., the user endpoint devices are static or pedestrian). However, the PF scheduling algorithms are suboptimal when these assumptions do not hold. For example, the users may be on highways and may be highly mobile. Highly mobile user endpoint devices are associated with base-stations for short periods and experience a non-stationary channel condition due to slow-fading. Slow-fading is mainly caused by changes in received signal strength due to path loss and shadowing. The slow-fading is observed in a time period on the order of seconds, as opposed to the order of milliseconds for the case of fast-fading.

In one embodiment, the present disclosure provides a method for allocating timeslots on channels to user endpoint devices that is near optimal regardless of whether the channel state is stationary or not, and regardless of whether or not the user endpoint devices' association times with particular sectors are long or short. The method of the present disclosure teaches a Predictive Finite-horizon PF Scheduling $((PF)^2S)$ Framework that exploits the mobility of the user endpoint devices and takes advantage of both slow-fading and fast-fading. The method comprises two components: a component for data rate prediction, and a component for providing an estimation of future timeslot allocations.

In order to predict the data rates, the method first performs a measurement of the signal quality of each sector. For example, for each sector of each base station in a network, the method determines a signal quality $E_c/I_o$. The method then constructs channel quality maps from the signal qualities, e.g., the $E_c/I_o$, determined from the measurements.

In one embodiment, the channel quality maps may be constructed offline. For example, the channel quality maps may be constructed for a large geographical area and updated periodically.

The method then determines user endpoint devices' locations and velocities. In one embodiment, the user endpoint devices' locations may be determined by querying each user endpoint device's GPS (global positioning system). In another embodiment, the user endpoint devices' locations may be determined via a Channel History Localization Scheme (CHLS) which requires some knowledge of each user endpoint device's trajectory. In one embodiment, the CHLS may use a warping algorithm.

The method may then predict the data rates for the user endpoint devices from the user endpoint devices' locations and velocities. For example, for each user endpoint device, the method may determine the data rate at each location.

In order to provide an estimation of future timeslot allocations, the method utilizes the above predictions of the data rates in conjunction with an algorithm for allocating resources to each user endpoint device.

In order to properly formulate the problem of scheduling resources, first let $E_c/I_{oj}$ represent the value of channel quality in time slot j. The user endpoint devices periodically report their respective $E_c/I_o$ to the sector. The timeslots are known. Therefore, when a channel quality for a sector is reported by a particular user endpoint device, the value of the channel quality can be correlated to particular timeslot (timeslots). Then, an appropriate channelization code is selected by the sector and mapped to a feasible data rate. The mapping from a particular value of $E_c/I_o$ to a particular feasible data rate may depend on the type of user endpoint device, e.g., an iPhone®, a Galaxy® phone, etc. The feasible data rate of user i in slot j may be denoted by $r_{ij}$. An opportunistic scheduler implemented in the sector may then utilize the multiuser diversity of the data rates to allocate downlink timeslots to users. In one embodiment, a plurality of endpoint devices may share a timeslot. However, for ease of understanding, the method of the present disclosure is described assuming one user endpoint device is allocated to a particular timeslot. The method for allocating of timeslots of the present disclosure attempts to optimize the allocation of the timeslots over a finite time horizon without making assumptions regarding the channel state distributions.

For a sector, let K represent a number of associated user endpoint devices with backlogged downlink buffers. Although, the number of associated user endpoint devices varies with time, the problem is formulated for a specific time period, wherein the number of user endpoint devices is a given number. Then, denote by $\alpha_{ij}$ a value of a scheduler allocation, for a user endpoint device i and a timeslot j. If user endpoint device i is allocated timeslot j, $\alpha_{ij}=1$. Otherwise, $\alpha_{ij}=0$. For all user endpoint devices and timeslots, the feasible data rates and allocations may then be represented in a matrix form. Let, $R=\{r_{ij}\}_{K\times T}$ represent the feasible data rate matrix, and let $\alpha=\{\alpha_{ij}\}_{K\times T}$ represent the scheduler allocation matrix, wherein T represents a finite time horizon in timeslots that corresponds to the timeslots the user endpoint devices are associated with the sector. By the end of slot T, user endpoint device i accrues a cumulative service $\Sigma_{j=1}^{T}\alpha_{ij}r_{ij}$. The finite-horizon proportional fairness scheduling problem may then be formulated as an optimization problem that seeks to maximize a proportional fair cost function for maximizing throughput. Then, the finite-horizon proportional fairness scheduling problem may be represented mathematically as:

$\max_{\alpha}C=\Sigma_{i=1}^{k}\log(\Sigma_{j=1}^{T}\alpha_{ij}r_{ij})$ (1)

subject to $\Sigma_{i=1}^{K}\alpha_{ij}=1 \; \forall j=1,\ldots,T$ (2)

$\alpha_{ij}\epsilon\{0,1\}$. (3)

Although, the focus of the present disclosure is on proportional fairness, the method of the present disclosure may be applied to other concave cost functions (e.g. α–fairness class).

The above optimization problem is NP-hard, even with full knowledge of the feasible data rate matrix. In practice, this problem may be solved in an online, causal, manner. For example, user endpoint devices may be scheduled timeslot-by-timeslot, based only on knowledge of the history and without full knowledge of the feasible data rate matrix.

In order to clearly describe the approach for solving the above optimization problem, the following nomenclature is provided.

Throughput refers to the average data rate allocated to all user endpoint devices. Mathematically, throughput may be represented by $\Sigma_{i=1}^{K}\Sigma_{j=1}^{T}\alpha_{ij}r_{ij}/T$.

Delay refers to a number of consecutive time slots in which a user endpoint device i does not receive an allocation of a timeslot. Delay is denoted by $d_i$. User endpoint device i is said to be starved if $d_i \geq D_{starved}$, wherein $D_{starved}$ is a delay threshold.

A finite time horizon in seconds is denoted by T.

In order to make the timeslot-by-timeslot allocation, the method of the present disclosure utilizes a gradient ascent approach that maximizes the objective function of equation (1). For each time slot, the timeslot is allocated to the user endpoint device corresponding to the largest increase of the objective function. The gradient for user endpoint device i in timeslot j may be obtained by temporarily relaxing the constraint in equation (3). The gradient for user i in timeslot j may then be represented as:

$$\frac{\partial C}{\partial \alpha_{ij}} = \frac{r_{ij}}{\sum_{t=1}^{T}\alpha_{it}r_{it}} = \frac{r_{ij}}{\sum_{t=1}^{j-1}\alpha_{it}r_{it} + \alpha_{ij}r_{ij} + \sum_{t=j+1}^{T}\alpha_{it}r_{it}}.$$ (4)

Computing of the above gradient requires knowledge of the entire data rate matrix and is not feasible for an online algorithm which has knowledge of only the past. Hence, the method of the present disclosure breaks up the denominator of equation (4) into three components that represent, the past, the present and the future, respectively. The past and the present are known for any time-slot. To enable the slot-by-slot-scheduling, the future component is computed as part of the scheduling process.

Predictions of future feasible data rates and estimates of future timeslot allocations are denoted by $\tilde{r}_{ij}$ and $\tilde{r}_{ij}$, respectively, with the respective matrix representations denoted by $\hat{R}$ and $\hat{\alpha}$. At time 0, predictions of $\hat{R}$ and $\hat{\alpha}$ are pre-computed for the entire horizon that comprises T timeslots. For each user endpoint device i in each timeslot j, a ranking $M_{ij}$ which corresponds to equation (4), is computed using $\hat{R}$ and $\hat{\alpha}$. The method then selects the user endpoint device with the highest ranking for the particular timeslot.

For a stationary channel (i.e., subject only to fast-fading), the future channel statistics are captured in the past component of the denominator of equation (4). As described previously, algorithms that rely only on past information may perform optimally. However, for the non-stationary channel distributions (i.e., subject to both fast-fading and slow-fading) of the present disclosure, knowledge of the past is not adequate. Hence, the present disclosure utilizes the future components along with the present and past components. By incorporating the predicted future, the present method leverages knowledge of slow-fading trends. By making slot-by-slot decisions, the framework also leverages fast-fading components.

Since the method aims to schedule timeslots for user endpoint devices during slow-fading peaks, it is essential to ensure that this does not result in long delays. Hence, in each timeslot, the framework first considers the set of starved users whose wait time exceeds $D_{starved}$ and selects one of the starved user endpoint devices, if at least one starved user endpoint device exists. If no user endpoint device is starved, the method selects among all user endpoint devices. Thereby, the framework can handle delay constraints. Note that if no delay constraints exist, considerations of the delay can be ignored by setting $D_{starved}$ to infinity.

An exemplary pseudo-code for computing the future components of equation (4) is provided below in Table-1.

TABLE 1

An Exemplary Algorithm for Predicting Data Rates and Estimating Future Timeslot Allocations 1: Predict future data dates $\hat{R} = \{\hat{r}_{ij}\}_{K \times T}$
2: Estimate future timeslot allocations $\hat{\alpha} = \{\hat{\alpha}_{ij}\}_{K \times T}$
3: For slot j = 1 to T do 4: Compute $M_{ij} = \dfrac{r_{ij}}{\sum_{t=1}^{j-1} \alpha_{it} r_{it} + \sum_{t=j+1}^{T} \alpha_{it} r_{it}}$, $\forall i \in K$ 5: if $\exists i \in K$ with $d_i \geq D_{starved}$, then
6: $i^* = \text{argmax}_{\{i \in K: d_i \geq D_{starved}\}} M_{ij}$
7: else $i^* = \text{argmax}_{i \in K} M_{ij}$
8: $\hat{\alpha}_{i^*,j} = 1$, $\hat{\alpha}_{i,j} = 0$ $\forall i \neq i^*$ In order to compute $\hat{R}$, the method leverages the fact that the slow-fading component of $E_c/I_o$ is highly reproducible, and utilizes a Coverage Map Prediction Mechanism (CMPM). As described above, in an offline phase, measurement traces may be processed to construct a geographical coverage map. Then, in an online phase, the user endpoint devices' locations and velocity are determined. Then, the locations and velocities are used in conjunction with the coverage map that is constructed, in order to predict each use endpoint device's feasible future data rate. For example, for user endpoint device i, feasible rates $\tilde{r}_{ij}$ are predicted for $\forall 1 \leq j \leq T$.

In one embodiment, the location may be determined by querying the user's. GPS. For example, the coverage map may be constructed offline (once for each route) by placing a lattice over a geographic plane, and dividing it into square segments. Each segment, denoted by b, is covered by a set of sectors to which a user endpoint device residing in the sector can associate, denoted by $U_b$. For each segment b, the physical layer attributes may be measured and stored. For example, a total in-band power (including interference and noise), termed RSSI, a received pilot-power (RSCP), and a ratio between the pilot power and the total interference $E_c/I_o$ may be measured and stored. These key attributes characterize the channel quality of timeslots and are periodically reported by the user to the serving sector. While the RSCP and the $E_c/I_o$ are specific to each nearby sector's pilot channel, the RSSI is not. The method then determines an average RSSI value, an average value of $E_c/I_o$, and an average value of RSCP for every nearby sector $u \in U_b$. These are denoted by $\overline{RSSI}\langle b \rangle$, $\overline{E_c/I_{o_u}}\langle b \rangle$, and $\overline{RSCP_u}\langle b \rangle$, respectively. In order to compute these values, each sample measurement may be tagged with a GPS location and tied to an appropriate segment.

In another embodiment, the location may be based on a Channel History Localization Scheme (CHLS) without the use of the GPS, by assuming knowledge of the user endpoint device's overall trajectory. First, the method matches the user endpoint device's historical channel quality of timeslots to coverage map segments on the user endpoint device's trajectory, based on the differences between channel metric values. Then, the user endpoint device's location is estimated as the segment paired with its current channel quality value. Matching the channel quality history (i.e., a time-series) to segments (i.e., locations) depends on the user endpoint device's velocity, which can vary. Hence, the method utilizes a Dynamic Time Warping (DTW) algorithm to unwarp the user endpoint device's historical channel qualities of timeslots to best fit the coverage map. The CHLS requires knowledge of the user endpoint device's trajectory and the user endpoint device's location at a time slot in the recent history. The user endpoint device's historical channel measurements are available at no extra cost as channel measurements are periodically reported for each timeslot to the network for scheduling and hand-off purposes.

The notation used to describe the scheme is defined below. The sector keeps a history of each user endpoint device's $E_c/I_o[j]$, $RSCP_u[j]$, and $RSSI[j]$ for the past $T_p$ timeslots, which are numbered sequentially from 1 to $T_p$ (present timeslot). The coverage map segments are sequentially numbered, starting with the segment which is the user endpoint device's estimated location at timeslot 1. The segments are numbered up to $B_{max}$, which is the furthest segment in which the user endpoint device could reside within the sector's coverage area. The serving sector covers a range of segments $B = \{b: B_{cell} \leq b \leq B_{max}\}$. The DTW Algorithm is applied to identify the cost of selecting each $b \in B$ as the location estimate for a particular user endpoint device. The method constructs H, a matrix of size $B_{max} \times T_p$. The value of entry $h_{b,j}$ represents the minimum cost of pairing timeslots from 1 to j with segments 1 to b. The constraint is that segment 1 is paired with timeslot 1 and segment b is paired with timeslot j (e.g., the end points are paired). The entries in the first row and column are, $h_{1,j}, h_{b,1} = \infty \forall b, j$, and the rest of the matrix is computed using $h_{b,j} = c(b,j) + \min(h_{b-1,j}, h_{b,j-1}, h_{b-1,j-1})$, where the cost of matching segment b to timeslot j is $c(b,j) = (RSSI[j] - \overline{RSSI}\langle b \rangle)^2 + \Sigma_{u \in U_b}(E_c/I_o[j] - E_c/I_{o_u}\langle b \rangle)^2 + (RSCP_u[j] - \overline{RSCP_u}\langle b \rangle)^2$.

If channel quality history does not exist for sector $u \in U_b$ at timeslot j, then $c(b,j) = \infty$. Note that the CHLS uses all three channel quality attributes to increase accuracy. Moreover, for each timeslot, it utilizes channel quality attributes corresponding to several sectors. The method then estimates that the user endpoint device resides in $b^* = \text{argmin}_{b \in B} h_{b, T_p}$.

A user endpoint device's future data rates may then be predicted from the coverage map and the estimates of the user endpoint device's current location and velocity (either from GPS or the CHLS, as described above). For example, in one embodiment, the future locations may be predicted assuming the velocity is constant for future timeslots. Each location is then mapped to a segment in the coverage map, which in turn yields a data rate. In one embodiment, the user endpoint device's velocity is estimated, using training data to compute an average of past velocities near the estimated location.

As described above, the method of the present disclosure performs timeslot allocation estimations based on the data rate predictions. This can be viewed as obtaining a solution to the scheduling problem using the predicted data rate matrix $\hat{R}$. As the framework operates in an online manner, some design considerations are simplicity and robustness to prediction errors. The present disclosure provides three algorithms which tradeoff fairness and throughput performance of the timeslot allocation, for robustness to prediction errors in allocating the timeslots. For example, if the data rate is highly reliable, a first algorithm may yield better fairness and throughput performance as compared to other algorithms. In another example, if the data rate is not as highly reliable, a second algorithm may yield better fairness and throughput performance as compared to other algorithms.

In one embodiment, the present method performs timeslot allocation estimations for a channel via a first algorithm. The first algorithm utilizes a Round-Robin Estimation (RRE) that assumes future time slots are allocated in a round-robin manner and each user endpoint device receives an equal number of time slots—resulting in an estimated allocation of $\hat{\alpha}_{ij}=1/K \; \forall i,j$.

In one embodiment, the present method performs timeslot allocation estimations for a channel via a second algorithm. The second algorithm utilizes a Blind Gradient Estimation (BGE) to select a user endpoint device in each slot, without the use of the future component. Specifically, starting from $j=1$, the method sets $\hat{\alpha}_{i^*,j}=1$, where $i^*=\mathrm{argmax}_{i \in K}(\hat{r}_{ij})/\Sigma_{t=1}^{j} \hat{\alpha}_{it}\hat{r}_{it}$. The expression contains only time slot indices≤j and requires O(KT) operations.

In one embodiment, the present method performs timeslot allocation estimations for a channel via a third algorithm. The third algorithm utilizes a greedy allocation scheme and is referred to as a Local Search Estimation algorithm. The method first chooses random values for α. The method then begins from timeslot number 1 and computes an initial value for an objective function $C=\Sigma_{i=1}^{K} \log(\Sigma_{j=1}^{T}(\hat{r}_{ij}\hat{\alpha}_{ij}))$. The method then iteratively allocates timeslot-by-timeslot to a user, wherein the timeslot is allocated to the user endpoint device with the largest gradient value, assuming all other timeslots are fixed. The algorithm proceeds cyclically, returning to timeslot 1 after allocating timeslot T, until reaching a local-maximum. The local-maximum is reached when there is no change in the timeslot allocations in T iterations. Termination of the algorithm is guaranteed since the objective value is bounded from above. Theoretically, each cycle of the LSE algorithm takes O(KT) computations. However, practically, the algorithm terminates after a few cycles.

An exemplary algorithm for LSE estimation is provided below in Table-2:

TABLE 2

An Exemplary LSE algorithm for timeslot allocation estimation

Input: Predicted future data dates $\hat{R} = \{\hat{r}_{ij}\}_{K \times T}$
Output: Estimated timeslot allocations $\alpha = \{\alpha_{ij}\}_{K \times T}$
1: Choose an initial random α
2: j = 1, LastChange = 1, C = $\Sigma_{i=1}^{K}$ log ($\Sigma_{j=1}^{T}(\hat{r}_{ij}\hat{\alpha}_{ij})$)
3: Repeat i* = argmax$_{i \in K}\hat{r}_{ij}/ \Sigma_{t \in \{1,T\} \backslash j}(\hat{r}_{it}\hat{\alpha}_{it})$
4: $\hat{\alpha}_{i^*,j} = 1, \hat{\alpha}_{i,j}=0 \; \forall i \neq i^*$
5: C' = $\Sigma_{i=1}^{K}$ log ($\Sigma_{j=1}^{T}(\hat{r}_{ij}\hat{\alpha}_{ij})$)
6: if (C' > C) then C = C', LastChange = j
7: j = (j mod T) + 1
8: until j ≠ LastChange If the rate predictions are accurate, the LSE provides the best performance, since the LSE allocates slots near the peak rates. The BGE allocates around the peak rates resulting in moderately good performance. RRE allocates slots uniformly. If the rate prediction is not reliable, RRE provides the most robustness to prediction errors. In one embodiment, an algorithm for allocating resources may be selected based on a desired degree of robustness of the prediction. For example, if absolute accuracy of the prediction is desired, a particular algorithm that is resistance to prediction error may be selected.

Figure 2:
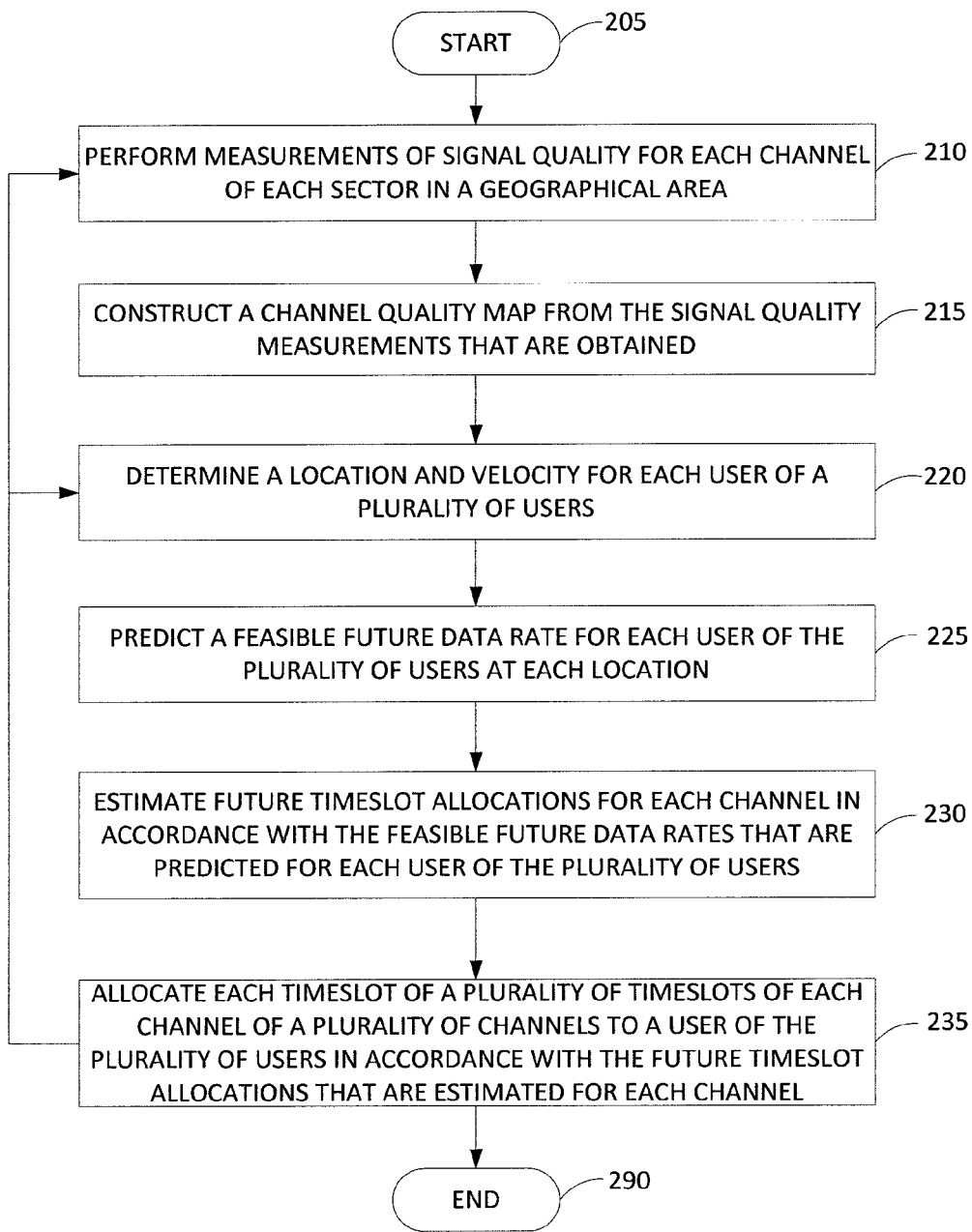
FIG. 2 illustrates a flowchart of a method for allocating timeslots for each channel of a plurality of channels in a wireless network.

FIG. 2 illustrates a flowchart of a method 200 for allocating timeslots on channels in a wireless network. For example, the method may be implemented in a base station, e.g., an eNodeB as shown in FIG. 1 or a general purpose computer illustrated in FIG. 3 below. Method 200 starts in step 205 and proceeds to step 210.

In step 210, method 200 performs measurements of signal quality for each channel of any number of channels in each sector in a geographical area. For example, the method determines $E_c/I_o$ for each channel of each sector serving a geographical area.

In step 215, method 200 constructs a channel quality map from the signal quality measurements that are obtained in step 210.

In step 220, method 200 determines a location and velocity for each user endpoint device of a plurality of user endpoint devices. In one embodiment, the location and velocity of a particular user endpoint device may be determined by querying the particular user endpoint device's GPS device. In another embodiment, the location and velocity of the particular user endpoint device may be determined via a channel history localization scheme. In one embodiment, the channel history localization scheme determines the location for the particular user endpoint device in accordance with the user endpoint device's trajectory. For example, the particular user endpoint device may be traveling on a highway and may be following a particular route on the highway. In one embodiment, the particular user endpoint device's trajectory is determined via a warping algorithm.

In step 225, method 200 predicts or estimates a feasible future data rate for each user endpoint device of the plurality of user endpoint devices at each location. The feasible future data rate for a particular user endpoint device is determined in accordance with the particular user endpoint device's location, the particular user endpoint device's velocity, and the channel quality map constructed in step 215.

In step 230, method 200 estimates future timeslot allocations for each channel in accordance with the feasible future data rates that are predicted in step 225 for each user endpoint device of the plurality of user endpoint devices.

In one embodiment, the future timeslot allocations are estimated via a round robin estimation algorithm that assumes that the timeslots are allocated in the future in a round-robin manner such that each user endpoint device of the plurality of user endpoint devices receives an equal number of timeslots.

In one embodiment, the future timeslot allocations are estimated via a blind gradient estimation algorithm that allocates future timeslots by selecting a particular user endpoint device of the plurality of user endpoint devices without considering a future component. For example, the method allocates the timeslots based on knowledge of the past and the present feasible data rates and timeslot allocations.

In one embodiment, the future timeslot allocations are estimated via a local search estimation algorithm that iteratively allocates each timeslot of each channel to a user endpoint device of the plurality of user endpoint devices with a largest gradient value, assuming timeslot allocations for all other channels are fixed, repeating the iterating until a local-maximum is reached. When the local-maximum is reached, there will be no change in timeslot allocations in T iterations.

In step 235, method 200 allocates each timeslot of a plurality of timeslots of each particular channel to a user endpoint device of the plurality of user endpoint devices in accordance with the future timeslot allocations that are estimated for the particular channel. The method then proceeds to either step 290 to end the process or returns to step 210 or 220.

Figure 3:
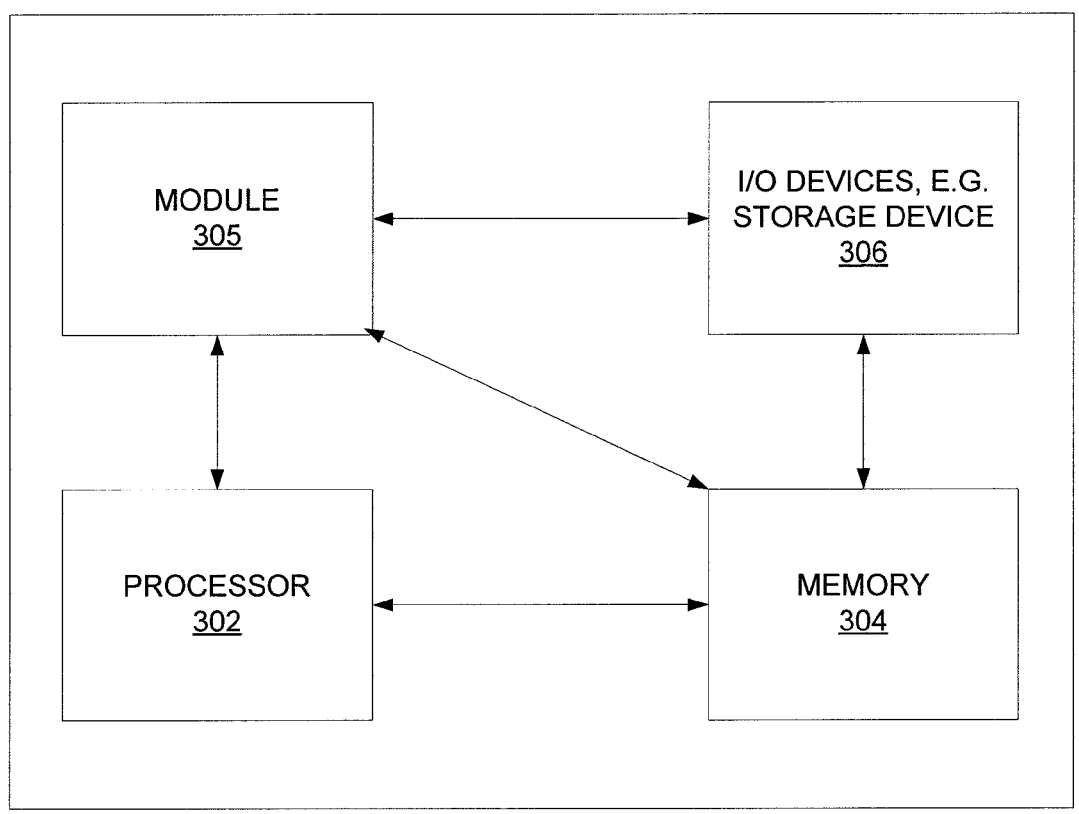
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for allocating timeslots on channels, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for allocating timeslots on channels (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for allocating timeslots on channels (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allocating a plurality of timeslots of a channel of a plurality of channels in a wireless network, the method comprising:

constructing, by a processor, a channel quality map from signal quality measurements that are obtained for each timeslot of the channel of the plurality of channels of each sector in a geographical area;

determining, by the processor, a future location that is predicted using a velocity for each user endpoint device of a plurality of user endpoint devices, wherein the future location and the velocity of each user endpoint device are determined via a channel history localization scheme, wherein the channel history localization scheme determines the future location for each user endpoint device in accordance with a trajectory of each user endpoint device, wherein the trajectory of each user endpoint device is determined via a warping algorithm;

estimating, by the processor, a future data rate for each user endpoint device at the future location using the channel quality map;

estimating, by the processor, future timeslot allocations of the channel of the plurality of channels in the wireless network based on the future data rate that is estimated for each user endpoint device for the future location; and allocating, by the processor, each timeslot of the plurality of timeslots of the channel of the plurality of channels in the wireless network to be communicated to a user endpoint device of the plurality of user endpoint devices for use in accordance with the future timeslot allocations that are estimated for the channel for the future location.

2. The method of claim 1, wherein the channel quality map is constructed offline.

3. The method of claim 1, wherein the channel quality map is updated periodically.

4. The method of claim 1, wherein the future timeslot allocations of the channel are estimated via a round robin estimation algorithm.

5. The method of claim 4, wherein the round robin estimation algorithm assumes that future timeslot allocations are performed where all user endpoint devices of the plurality of user endpoint devices receive equal number of timeslots.

6. The method of claim 1, wherein the future timeslot allocations are estimated via a blind gradient estimation algorithm that allocates each timeslot of the channel of the plurality of channels to a respective user endpoint device of the plurality of user endpoint devices based on a knowledge of past and present data rates and timeslot allocations.

7. The method of claim 1, wherein the future timeslot allocations are estimated via a local search estimation algorithm that iteratively allocates each timeslot of the channel of the plurality of channels to the user endpoint device of the plurality of user endpoint devices with a largest gradient value until a local-maximum is reached.

8. A computer-readable storage device storing a plurality of instructions which, when executed by a processor, cause the processor to perform operations for allocating a plurality of timeslots of a channel of a plurality of channels in a wireless network, the operations comprising:

constructing a channel quality map from signal quality measurements that are obtained for each timeslot of the channel of the plurality of channels of each sector in a geographical area;

determining a future location that is predicted using a velocity for each user endpoint device of a plurality of user endpoint devices, wherein the future location and the velocity of each user endpoint device are determined via a channel history localization scheme, wherein the channel history localization scheme determines the future location for each user endpoint device in accordance with a trajectory of each user endpoint device, wherein the trajectory of each user endpoint device is determined via a warping algorithm;

estimating a future data rate for each user endpoint device at the future location using the channel quality map;

estimating future timeslot allocations of the channel of the plurality of channels in the wireless network based on the future data rate that is estimated for each user endpoint device for the future location; and allocating each timeslot of the plurality of timeslots of the channel of the plurality of channels in the wireless network to be communicated to a user endpoint device of the plurality of user endpoint devices for use in accordance with the future timeslot allocations that are estimated for the channel for the future location.

9. The computer-readable storage device of claim 8, wherein the channel quality map is constructed offline.

10. The computer-readable storage device of claim 8, wherein the channel quality map is updated periodically.

11. The computer-readable storage device of claim 8, wherein the future timeslot allocations of the channel are estimated via a round robin estimation algorithm.

12. The computer-readable storage device of claim 11, wherein the round robin estimation algorithm assumes that future timeslot allocations are performed where all user endpoint devices of the plurality of user endpoint devices receive equal number of timeslots.

13. The computer-readable storage device of claim 8, wherein the future timeslot allocations are estimated via a blind gradient estimation algorithm that allocates each timeslot of the channel of the plurality of channels to a respective user endpoint device of the plurality of user endpoint devices based on a knowledge of past and present data rates and timeslot allocations.

14. The computer-readable storage device of claim 8, wherein the future timeslot allocations are estimated via a local search estimation algorithm that iteratively allocates each timeslot of the channel of the plurality of channels to the user endpoint device of the plurality of user endpoint devices with a largest gradient value until a local-maximum is reached.

15. An apparatus for allocating a plurality of timeslots of a channel of a plurality of channels in a wireless network, the apparatus comprising:

a processor, and a computer-readable storage device storing a plurality of instructions which, when executed by the processor, cause the processor to perform operations, the operations comprising:

constructing a channel quality map from signal quality measurements that are obtained for each timeslot of the channel of the plurality of channels of each sector in a geographical area;

determining a future location that is predicted using a velocity for each user endpoint device of a plurality of user endpoint devices, wherein the future location and the velocity of each user endpoint device are determined via a channel history localization scheme, wherein the channel history localization scheme determines the future location for each user endpoint device in accordance with a trajectory of each user endpoint device, wherein the trajectory of each user endpoint device is determined via a warping algorithm;

estimating a future data rate for each user endpoint device at the future location using the channel quality map;

estimating future timeslot allocations of the channel of the plurality of channels in the wireless network based on the future data rate that is estimated for each user endpoint device for the future location; and allocating each timeslot of the plurality of timeslots of the channel of the plurality of channels in the wireless network to be communicated to a user endpoint device of the plurality of user endpoint devices for use in accordance with the future timeslot allocations that are estimated for the channel for the future location.

16. The apparatus of claim 15, wherein the channel quality map is constructed offline.

17. The apparatus of claim 15, wherein the channel quality map is updated periodically.

18. The apparatus of claim 15, wherein the future timeslot allocations of the channel are estimated via a round robin estimation algorithm.

19. The apparatus of claim 15, wherein the future timeslot allocations are estimated via a blind gradient estimation algorithm that allocates each timeslot of the channel of the plurality of channels to a respective user endpoint device of the plurality of user endpoint devices based on a knowledge of past and present data rates and timeslot allocations.

20. The apparatus of claim 15, wherein the future timeslot allocations are estimated via a local search estimation algorithm that iteratively allocates each timeslot of the channel of the plurality of channels to the user endpoint device of the plurality of user endpoint devices with a largest gradient value until a local-maximum is reached.

* * * * *